United States Patent [19]

Matoba et al.

[11] 4,174,341

[45] Nov. 13, 1979

[54] UNCURED CHLORINATED POLYETHYLENE COMPOSITION WITH HEXAMETHYLPHOSPHORIC TRIAMIDE AND MERCAPTOTRIAZINE

[75] Inventors: Yasuo Matoba, Suita; Yoshio Kise; Nobuo Yamada, both of Amagasaki; Akira Hashimoto, Itami; Tetsuya Nakata, Ibaraki, all of Japan

[73] Assignee: Osaka Soda Co. Ltd., Osaka, Japan

[21] Appl. No.: 683,678

[22] Filed: May 5, 1976

[30] Foreign Application Priority Data

Dec. 19, 1975 [JP]  Japan .................................. 50-152393

[51] Int. Cl.$^2$ ..................... C08F 114/04; C08C 19/20; C08C 19/22
[52] U.S. Cl. ............. 260/45.7 S; 260/42.47; 260/27; 525/332; 525/340; 525/341; 525/348; 525/351
[58] Field of Search ..................... 260/79.5 R, 79.5 C, 260/791, 45.7; 526/17, 30, 27

[56] References Cited

U.S. PATENT DOCUMENTS

| 2,804,450 | 8/1957 | Naylor | 260/79.5 B |
| 3,004,005 | 10/1961 | Malz | 260/79.5 R |
| 3,366,598 | 1/1968 | Westlinning | 260/79.5 X |
| 3,624,029 | 11/1971 | Inagami | 260/45.9 R |

*Primary Examiner*—C. A. Henderson
*Attorney, Agent, or Firm*—Sherman & Shalloway

[57] ABSTRACT

A cured or uncured chlorinated polyethylene composition comprising
(A) chlorinated polyethylene,
(B) a complex formed between hexamethylphosphoric triamide and a member selected from the group consisting of carboxylic acids, cyanuric acid, substituted or unsubstituted phenols, alcohols and metal salts, and
(C) a member selected from the group consisting of (a) a mercaptotriazine, (b) a thiuram disulfide and (c) sulfur. And a process for curing chlorinated polyethylene, which comprises heating it in the presence of (B) and (C) at a temperature of about 100° to about 200° C.

4 Claims, 2 Drawing Figures

UNCURED CHLORINATED POLYETHYLENE COMPOSITION WITH HEXAMETHYLPHOSPHORIC TRIAMIDE AND MERCAPTOTRIAZINE

BACKGROUND OF THE INVENTION

This invention relates to a cured chlorinated polyethylene composition having superior mechanical properties such as low permanent compression set and other superior properties such as resistances to weather, ozone, chemicals, oils and to heat and reduced coloration, and also to an uncured chlorinated polyethylene composition which exhibits such improved properties after curing. The invention also relates to a process for curing an uncured chlorinated polyethylene composition by heating, which can impart these improved properties to chlorinated polyethylene at relatively low temperatures and within relatively short periods of time without involving any operational troubles.

Chlorinated polyethylene, particularly, substantially amorphous rubbery chlorinated polyethylene having a chlorine content of 25 to 45%, is a useful elastomeric material, and upon being sufficiently cured, becomes a rubbery material having superior mechanical properties, and resistances to heat, weather, ozone, chemicals and oil.

In order to cure chlorinated polyethylene, various methods using peroxides, thiourea derivatives, and thiuram sulfides, for example, have heretofore been suggested. The methods relying on the use of thiourea derivatives and thiuram sulfides suffer from a very slow rate of curing, and can scarcely afford cured products having satisfactory properties as rubber.

The method using peroxides is considered to be able to give the best cured product among these methods. However, the peroxides cause various troubles during their handling or with regard to curing conditions, such as the handling danger of low temperature-decomposable peroxides, the disadvantage of the rise of the curing temperature caused by high temperature-decomposable peroxides, and the obstruction of curing in the presence of oxygen. Accordingly, it has been very difficult by the conventional art to provide a cured chlorinated polyethylene composition which is useful as a rubbery material having satisfactory properties.

SUMMARY OF THE INVENTION

We have made extensive investigations in an attempt to afford a rubbery material composed of cured chlorinated polyethylene having satisfactory properties under conditions acceptable in the art. As a result, we have found that the above-mentioned improved properties can be achieved by heat curing chlorinated polyethylene (A) in the presence of the following compounds (B) and (C)

(B) a complex formed between hexamethylphosphoric triamide and a member selected from the group consisting of carboxylic acids, cyanuric acid, substituted or unsubstituted phenols, alcohols and metal salts, and (C) a member selected from the group consisting of
(a) a mercaptotriazine of the following formula

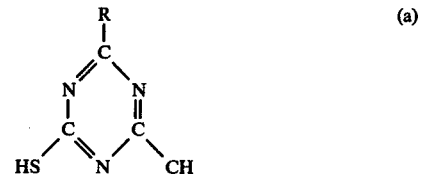

wherein R is a member selected from the group consisting of a mercapto group, alkylamino group with the alkyl moiety containing 1 to 8 carbon atoms, dialkylamino groups with the alkyl moiety containing 1 to 8 carbon atoms, cycloalkylamino groups with the cycloalkyl moiety containing 6 to 8 carbon atoms, dicycloalkylamino groups with the cycloalkyl moiety containing 6 to 8 carbon atoms, arylamino groups, preferably phenylamino, N-aryl-N-alkylamino groups with the alkyl moiety containing 1 to 8 carbon atoms, preferably N-phenyl-N-alkylamino, and alkoxy groups containing 1 to 8 carbon atoms, (b) a thiuram sulfide of the following formula

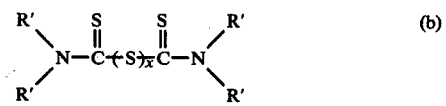

wherein R' is an alkyl group containing 1 to 5 carbon atoms, two R' groups bonded to the same nitrogen atom may together form an alkylene linkage, and x is a positive number of 1 to 4, and (c) sulfur.

When any member of component (C) used in this invention is incorporated singly in chlorinated polyethylene and the composition heated, little or no curing reaction takes place.

During the course of our investigations, we found that when chlorinated polyethylene and component (C) are heated in the presence of hexamethylphosphoric triamide, which is an ingredient for forming component (B), the curing reaction proceeds very smoothly. However, hexamethylphosphoric triamide exerts a hazardous action and gives off offensive odors because of its high vapor pressure. Furthermore, it is a hygroscopic low viscosity liquid, and has quick curability (scorching property). These handling inconveniences make it difficult to apply hexamethylphosphoric triamide in a commercial curing process for chlorinated polyethylene. The use of hexamethylphosphoric triamide in the form of a complex in accordance with this invention has led to the successful overcoming of the above inconveniences without causing the loss of its ability to promote the curing reaction.

Furthermore, since normally solid complex compounds can be used as component (B), their handling and weighing are simplified. Also, these complexes are available with the desired melting points and decomposition points, and therefore, processing safety, good processability and good dispersibility during mastication can be imparted. In addition, the flowability of the compound during fabrication is improved.

It is an object of this invention therefore to provide a cured chlorinated polyethylene composition having superior properties inherent to the chlorinated polyethylene, such as various mechanical properties, resistances to weather, ozone, chemicals, oil and to heat, and especially good permanent compression set and brightness-retaining property, and an uncured chlorinated polyethylene composition capable of affording such a cured composition.

Another object of this invention is to provide an improved process for curing a chlorinated polyethylene composition which without involving any operational troubles can impart the above-mentioned improved properties to the chlorinated polyethylene by a heat curing procedure at relatively low temperatures within relatively short periods of time which procedure has not come into commercial operation heretofore.

Other objects and advantages of this invention will become apparent from the following description and the following drawings in which.

DETAILED DESCRIPTION OF THE INVENTION

Figure 1:
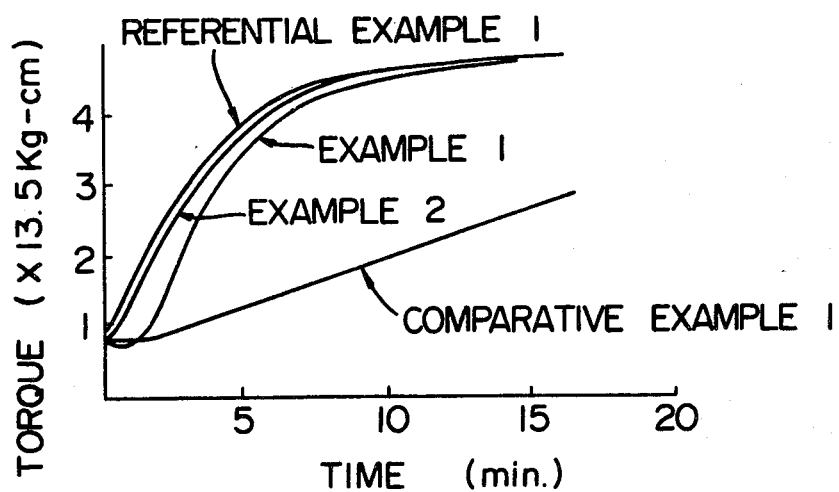
FIG. 1 shows the cure curves for Examples 1 and 2, referential Example 1.

The chlorinated polyethylene composition of this invention is characterized by comprising the components (A), (B) and (C).

The chlorinated polyethylene (A) is well known, and can be obtained by after-chlorination of polyethylene by methods known per se. Usually, it is preferred to use chlorinated polyethylene having a chlorine content of about 25 to 45%. For example, chlorinated polyethylene prepared by chlorinating polyethylene having a molecular weight of about 20,000 to about 150,000 are preferred.

Complexes (B) obtained from hexamethylphosphoric triamide and a member selected from the group consisting of carboxylic acids, cyanuric acid, substituted or unsubstituted phenols, alcohols and metal salts can be used either alone or in admixture. The component (B) may be added in the form of complex to chlorinated polyethylene, or the complex can be formed in situ by compounding the complex-forming ingredients with chlorinated polyethylene. Accordingly, the "complex", as referred to in this invention with regard to component (B), denotes not only a pre-formed complex added at the time of compounding, but also a plurality of complex-forming ingredients added at the time of compounding for preparing a complex in situ.

The hexamethylphosphoric triamide is a known compound of the following formula

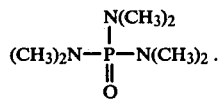

Examples of preferred members capable of forming complexes with the above compound include aliphatic mono- or di-carboxylic acids containing 1 to 18 carbon atoms; aromatic mono- or di-carboxylic acids with a $C_6$ or $C_{10}$ aromatic ring; the above aromatic mono- or di-carboxylic acids which contain a substituent selected from the group consisting of a hydroxyl group, halogen atoms, lower alkyl groups and lower alkoxy groups; a cyanuric acid; phenol or bisphenol; phenols containing a substituent selected from the group consisting of alkyl groups containing 1 to 8 carbon atoms, a hydroxyl group, halogen atoms, lower alkoxy groups and a formyl group; alcohols containing 1 to 8 carbon atoms; mono- or di-alkylene glycols with the alkylene moiety containing 2 to 8 carbon atoms; and magnesium chloride. Specific examples of these members are caprylic acid, lauric acid, fumaric acid, succinic acid, adipic acid, azelaic acid, sebacic acid, benzoic acid, p-hydroxybenzoic acid, toluic acid, m-chloro-benzoic acid, vanillic acid, phthalic acid, isophthalic acid, terephthalic acid, phenol, p-butyl phenol, o- and m-butyl anisole, o,o'-ditertiary butyl-p-cresol, p-octyl phenol, p-chlorophenol, hydroquinone, bisphenol, 4,4'-bishydroxyphenyl-2'-propane, 2,6-dimethoxy phenol, p-chlorophenol, vanillin, cyanuric acid, octyl alcohol, ethylene glycol, diethylene glycol, and magnesium chloride.

The component (C) used in the chlorinated polyethylene composition is selected from compounds (a), (b), and (c) which is sulfur.

Specific examples of the mercaptotriazine of formula (a) are 1,3,5-trithiocyanuric acid, 1-methoxy-3,5-dimercaptotriazine, 1-diethylamino-3,5-dimercaptotriazine, 1-dibutylamino-3,5-dimercaptotriazine, 1-cyclohexylamino-3,5-dimercaptotriazine, and 1-phenylamino-3,5-dimercaptotriazine.

Specific examples of the thiuram disulfide of formula (b) are tetramethylthiuram disulfide, tetraethylthiuram disulfide, dipentamethylenethiuram disulfide, and dipentamethylenethiuram tetrasulfide.

The preferred ratio of the components (A), (B) and (C) in the composition of this invention is such that about 0.5 to about 10 parts by weight of component (B) calculated as hexamethylphosphoric triamide and about 0.1 to about 10 parts by weight of component (C) are used per 100 parts by weight of the chlorinated polyethylene (A).

The chlorinated polyethylene composition of this invention may further contain various additives known in the art, for example, plasticizers, reinforcing agents or fillers, stabilizers, antioxidants, lubricants, tackifiers, pigments, fire retardants and acid acceptors. Examples of the plasticizers are esters of phosphoric acid or carboxylic acids, polyethers, and aliphatic or aromatic hydrocarbons. The plasticizers can be used in an amount of about 0.1 to about 100 parts by weight per 100 parts by weight of chlorinated polyethylene. Examples of the reinforcing agents or fillers are carbon black, white carbon, various silicate salts, carbonate salts, sulfate salts, and phenolic resins. They can be used in an amount of about 0.1 to about 100 parts by weight per 100 parts by weight of chlorinated polyethylene. The stabilizers include, for example, epoxy compounds and organo-tin compounds which are used in an amount of about 1 to about 10 parts by weight per 100 parts by weight of chlorinated polyethylene. Examples of the antioxidants are phenol derivatives, amine derivatives, phosphorous acid esters, mercapto derivatives, and dialkyl dithiocarbamic acid salts; they are used in an amount of about 0.1 to about 10 parts by weight per 100 parts by weight of chlorinated polyethylene. Examples of the lubricants are long-chain aliphatic carboxylic acids or long-chain aliphatic carboxylic acid salts, and they can be used in an amount of about 0.1 to about 5% by weight per 100 parts by weight, of chlorinated polyethylene. Examples of the tackifiers are alkyl phenol/formaldehyde resin, alkylphenol/acetylene resins, terpene resins, and rosin, and they are used in an amount of about 0.1 to about 10 parts by weight per 100 parts by weight od chlorinated polyethylene. The pigments include, for example, inorganic pigments such as flowers of zinc (zinc oxide), titanium white, red iron oxide, chrome yellow, or ultramarine, and organic pigments such as phthalocyanine pigments or azo pigments, which are used in an amount of about 0.1 to about 50 parts by weight per 100 parts by weight of chlorinated polyethylene. Examples of the fire retardants are antimony oxide and phosphoric acid esters, and they can be used in an amount of about 1 to about 30 parts by weight per 100 parts by weight of chlorinated polyethylene.

The use of the acid acceptors in the composition of this invention frequently gives favorable results in increasing the rate of curing the uncured composition and/or increasing the heat stability of the cured composition. Examples of such acid acceptors are the oxides, hydroxides, carbonates, carboxylates, silicates, and phosphites of metals of Group II of the periodic table, and the oxides, basic carbonates, basic carboxylates and basic phosphites of metals of Group IVA of the periodic table. Specific examples are magnesia, quick lime, magnesium hydroxide, magnesium carbonate, calcium carbonate, magnesium silicate, calcium silicate, calcium stearate, magnesium benzoate, magnesium phosphite, tin oxide, red lead, litharge, lead white, basic lead stearate, and basic lead phosphite. The acid acceptors can be used in an amount of about 1 to about 30 parts by weight per 100 parts by weight of the chlorinated polyethylene.

The chlorinated polyethylene composition of this invention can be produced by compounding the components (A), (B) and (C) and additives uniformly in an optional sequence. There is no particular restriction on the method of compounding, but any conventional techniques known in the art, such as mastication by open rolls, various blenders, or various kneaders, can be utilized as desired.

The uncured composition so obtained is heat-cured in the desired shape at a temperature of about 100° to about 200° C. to form a cured composition. Curing can be performed for a period of about 0.5 minute to about 120 minutes. Thus, according to this invention, there is provided a process for curing chlorinated polyethylene which comprises heating uncured chlorinated polyethylene in the presence of a curing agent, wherein the uncured chlorinated polyethylene is heated at a temperature of about 100° to about 200° C. in the copresence of the components (B) and (C) usually together with the additives described above.

There is no particular restriction on the means of curing, but various fabricating and curing methods, such as compression molding using a mold, injection molding, or heating in a steam curing tank, an air bath or a curing device utilizing electromagnetic waves, can be utilized.

It is especially noteworthy that in the process of this invention, the curing fabrication ends within short periods of time at relatively low temperatures; and that the resulting cured product has a low permanent compression set, and very superior ability to retain white color, light color, or brightness both against heat and weather. Needless to say, the cured composition of this invention has superior mechanical properties such as high tensile strength or abrasion resistance ascribable to the inherent characteristics of the chlorinated polyethylene.

The following examples illustrate the present invention specifically.

EXAMPLES 1 TO 5, REFERENTIAL EXAMPLES 1 TO 4 AND COMPARATIVE EXAMPLES 1 TO 5

The ingredients shown in Table 1 were kneaded by open rolls at 70° C., and fabricated into a sheet. The sheet was press-formed in a mold at 160° C. and 80 Kg/cm$^2$ for 30 minutes. The properties of the fabricated products were determined, and shown in Table 2.

Figure 2:
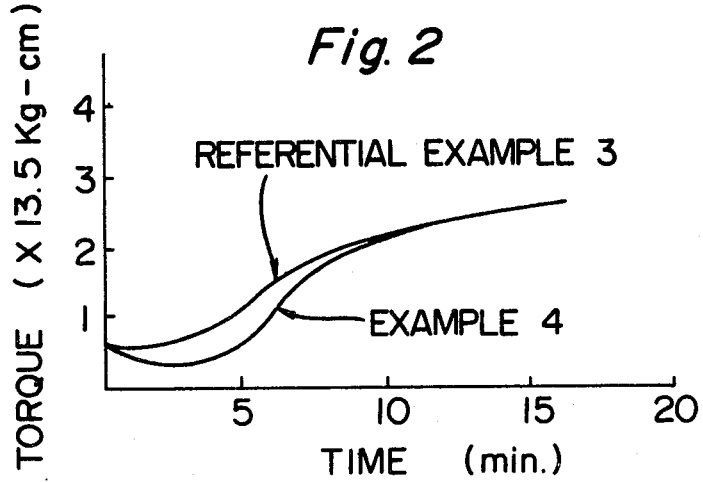
FIG. 2 illustrates the cure curves for Example 4 and referential Example 3.

The cure curve of the products were determined using a JSR-type curelastometer at 160° C. with an amplitude angle of 3°, and the results are shown in FIGS. 1 and 2. FIG. 1 shows the cure curves for Examples 1 and 2, Referential Example 1 and Comparative Example 1, and FIG. 2, the cure curves for Example 4 and Referential Example 3.

In each of the Examples, remarkable processing safety was imparted without changes in the rate of curing and the properties of the cured product as compared with the Referential Examples in which hexamethylphosphoric triamide alone was used.

Table 1

| Runs | CE 1 | CE 2 | RE 1 | E 1 | E 2 | CE 3 | RE 2 | E 3 | CE 4 | RE 3 | E 4 | CE 5 | RE 4 | E 5 |
|---|---|---|---|---|---|---|---|---|---|---|---|---|---|---|
| (Parts by weight) | | | | | | | | | | | | | | |
| Chlorinated polyethylene | 100 | 100 | 100 | 100 | 100 | 100 | 100 | 100 | 100 | 100 | 100 | 100 | 100 | 100 |
| SRF black | 40 | 40 | 40 | 40 | 40 | 40 | 40 | 40 | 40 | 40 | 40 | 40 | 40 | 40 |
| Dioctyl phthalate | 10 | 10 | 10 | 10 | 10 | 10 | 10 | 10 | 10 | 10 | 10 | 10 | 10 | 10 |
| Magnesia | 10 | 10 | 10 | 10 | 10 | 10 | 10 | 10 | 10 | 10 | 10 | 10 | 10 | 10 |
| Trithiocyanuric acid | | 1 | 1 | 1 | 1 | | | | | | | 1 | 1 | 1 |
| Sulfur | | | | | | 2 | 2 | 2 | | | | | | |
| Dipentamethylenethiuram disulfide | | | | | | | | | 3 | 3 | 3 | 2 | 2 | 2 |
| Hexamethylphosphoric triamine (mole) | | | 2 | | | | 3 | | | 3 | | | 2 | |
| 1:1 Complex of hexamethylphosphoric triamide and phthalic acid | | | | 3.74 | | | | 5.61 | | | 5.61 | | | |
| 1:1 (mole) complex of hexamethylphosphoric triamide and ditertiary butyl-p-cresol | | | | | 4.32 | | | | | | | | | 4.32 |
| 2-Mercaptoimidazoline | 4 | | | | | | | | | | | | | |

Note:
E stands for Example;
CE, Comparative Example;
RE, Referential Example.

Table 2

| Runs | CE 1 | CE 2 | RE 1 | E 1 | E 2 | CE 3 | RE 2 | E 3 | CE 4 | RE 3 | E 4 | CE 5 | RE 4 | E 5 |
|---|---|---|---|---|---|---|---|---|---|---|---|---|---|---|
| Mooney test (MS 121° C.) | | | | | | | | | | | | | | |
| $V_m$ | | | 60 | 56 | 59 | | | | | | | | 63 | 61 |
| $T_3$ (minutes, seconds) | | not cured | 6'30" | 10'15" | 7'45" | not cured | | | not cured | | | not cured | 3'15" | 4'45" |
| Properties of cured products | | | | | | | | | | | | | | |
| 200% Modulus (Kg/cm$^2$) | 76 | | 115 | 111 | 114 | | 45 | 42 | | 50 | 48 | | 103 | 103 |
| Tensile strength (Kg/cm$^2$) | 176 | | 178 | 179 | 183 | | 169 | 170 | | 161 | 160 | | 169 | 167 |
| Elongation at break (%) | 460 | | 330 | 341 | 330 | | 530 | 540 | | 510 | 520 | | 410 | 415 |
| Hardness (Shore A) | 77 | | 79 | 78 | 79 | | 78 | 77 | | 80 | 80 | | 78 | 78 |
| Permanent compression set (25% compression at 120° C. for 70 hours) | 71 | | 29 | 31 | 30 | | | | | | | | | |

Note: E, CE and Re are the same as the footnote to Table 1.

What we claim is:

1. A curable chlorinated polyethylene composition comprising:
(A) chlorinated polyethylene,
(B) a complex formed between hexamethylphosphoric triamide and a member selected from the group consisting of carboxylic acids, cyanuric acid, unsubstituted phenols, phenols substituted with alkyl of 1 to 8 carbon atoms, hydroxyl, halogen, lower alkoxy or formyl, alcohols and metal salts, and
(C) a mercaptotriazine of the formula

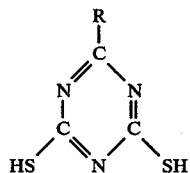

wherein R is a member selected from the group consisting of a mercapto group, alkylamino groups with the alkyl moiety containing 1 to 8 carbon atoms, dialkylamino groups with the alkyl moiety containing 1 to 8 carbon atoms, cycloalkylamino groups with the cycloalkyl moiety containing 6 to 8 carbon atoms, dicycloalkylamino groups with the alkyl moiety containing 6 to 8 carbon atoms, arylamino groups, N-aryl-N-alkylamino groups with the alkyl moiety containing 1 to 8 carbon atoms and alkoxy groups containing 1 to 8 carbon atoms.

2. The composition of claim 1 wherein the proportions of component (B), calculated as the hexamethylphosphoric triamide, and (C) are about 0.5 to about 10 parts by weight, and about 0.1 to about 10 parts by weight, respectively per 100 parts by weight of component (A).

3. The composition of claim 1 which further comprises at least one additive selected from the group consisting of plasticizers, fillers, stabilizers, antioxidants, lubricants, tackifiers, pigments, fire retardants and acid acceptors.

4. The composition of claim 1 wherein said complex as component (B) is a complex formed between hexamethylphosphoric triamide and a member selected from the group consisting of aliphatic mono- and di-carboxylic acids containing 1 to 18 carbon atoms, aromatic mono- and di-carboxylic acids containing a $C_6$ or $C_{10}$ aromatic ring, aromatic mono- and di-carboxylic acids containing a $C_6$ or $C_{10}$ aromatic ring which contain a substituent selected from the group consisting of a hydroxyl group, halogen atoms, lower alkyl groups and lower alkoxy groups, cyanuric acid, phenol or bisphenol, phenols containing a substituent selected from the group consisting of alkyl groups containing 1 to 8 carbon atoms, a hydroxy group, halogen atoms, lower alkoxy groups and a formyl group, alcohols containing 1 to 18 carbon atoms, mono- and di-alkylene glycols with the alkylene moiety containing 2 to 8 carbon atoms, and magnesium chloride.

* * * * *